Sept. 6, 1949.  W. P. LEAR  2,481,028
AXIALLY ENGAGING ELECTROMAGNETIC CLUTCH AND BRAKE
Filed June 5, 1944
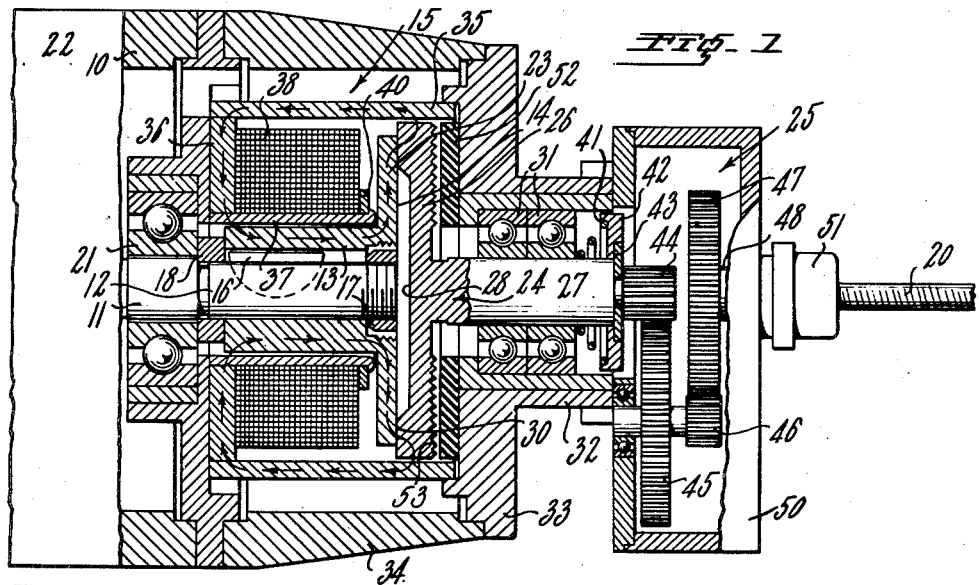
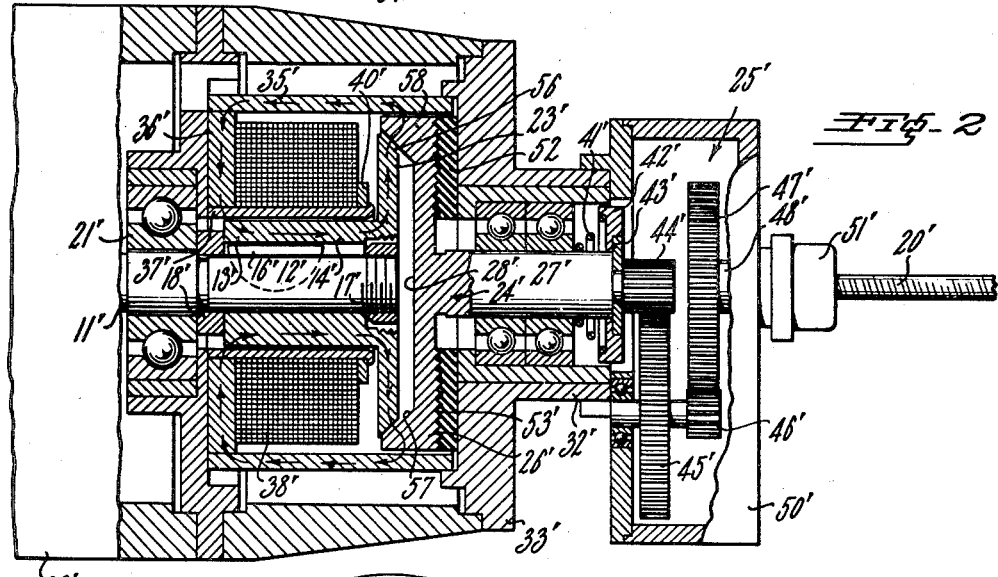
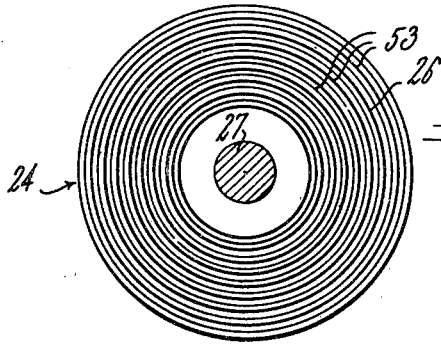
INVENTOR.
WILLIAM P. LEAR
BY
ATTORNEY Patented Sept. 6, 1949

2,481,028

UNITED STATES PATENT OFFICE 2,481,028

AXIALLY ENGAGING ELECTROMAGNETIC CLUTCH AND BRAKE

William P. Lear, North Hollywood, Calif., assignor, by mesne assignments, to Lear, Incorporated, Grand Rapids, Mich., a corporation of Illinois Application June 5, 1944, Serial No. 538,868

12 Claims. (Cl. 192—18)

This invention relates to an electromagnetic clutch construction, and more particularly to an electromagnetic clutch and brake unit having improved torque transmitting characteristics and improved braking action.

In the present invention, an electromagnetic clutch is provided in which the periphery of the driven member is disposed between the periphery of the driving member and a housing member forming part of the magnetic circuit. The magnetic flux path therein passes from the driving member through the periphery of the driven member into the housing member, eliminating special arrangements for securing effective flux interlinkage between driving and driven members. Additionally, as the driving member is increased in area, the unit braking pressure exerted thereby against a stationary brake shoe during a braking action of the unit may be decreased with the same total braking effect being maintained. A further increase in the total braking effect and a further decrease in the unit braking force required are provided by forming a plurality of concentric grooves in the braking surface of the driven member. These grooves deform a resilient or deformable braking surface associated with the driven member and thereby increase the total area of braking contact. The net result of these improvements is a decrease in the force required to bias the clutch driven member into engagement with the braking surface upon deenergization of the clutch, which correspondingly results in a decrease in the number of ampere turns required in the clutch magnetizing winding to produce the same amount of torque transmission through the clutch members.

It is among the objects of this invention to provide an electromagnetic clutch having improved torque transmitting characteristics; to provide an electromagnetic clutch and brake unit having increased braking action with a reduced unit braking force; to provide an electromagnetic clutch having fewer air gaps in the magnetic flux path; to provide an electromagnetic clutch and brake unit having a grooved braking member cooperable with a deformable brake shoe to increase the braking effect of the member on the brake shoe; and to provide an electromagnetic clutch and/or brake unit of improved design, increased efficiency and simplified construction.

These and further objects, advantages and features of the invention will be apparent from the following description and the accompanying drawing. In the drawing:

Fig. 1 is a cross-sectional view, partly in elevation, of an electromagnetic clutch construction embodying the invention.

Fig. 2 is a view similar to Fig. 1 illustrating a modified form of the invention.

Fig. 3 is an elevation view of the braking surface of a driven member forming part of the clutch illustrated in Figs. 1 and 2.

The embodiment of the invention illustrated in Fig. 1 comprises a reversible electric motor 10 operatively associated with an electromagnetic clutch and brake unit 15 arranged to drive a load, such as flexible shafting 20, through the medium of gearing 25. The motor armature shaft 11 is reduced at 12 to receive the hub 13 of the driving member 14 of the electromagnetic clutch. Driving member or disk 14 is secured for rotation with shaft 11 by a key 16, and is held in position thereon by a nut 17 threaded on the end of the reduced portion 12. A spacing washer 18 is disposed between hub 13 and bearing 21 supporting motor shaft 11 in motor housing 22. Member 14 includes the hub member 13 and a disk portion 23, both of magnetic material such as iron or steel.

Clutch driving member 14 is arranged to cooperate with a clutch driven member 24 comprising a disk portion 26 and a shaft portion 27, both likewise comprising magnetic material such as iron or steel. Driven disk 24 is substantially larger in diameter than driving disk 14 and is recessed as indicated at 28 providing a peripheral clutching surface 30 for frictional and magnetic coaction with disk 23 of member 14. Shaft 27 is mounted in suitable bearings 31 in an extension 32 of an end plate 33 secured to the clutch housing 34.

A tubular housing or sleeve 35 of magnetic material surrounds both clutch disks and extends close to the periphery of disk 26 to establish a low reluctance magnetic air gap therewith. A magnetic annular plate 36 engages the inner end of member 35 and extends inwardly toward hub 13 of driving member 14. A cylindrical winding support 37, of magnetic material, extends parallel to and in close relation with hub 13, to establish a low reluctance magnetic air gap therewith. Magnetizing winding 38 is supported on member 37, being retained thereon by suitable means such as a ring 40.

Driven member 24 is normally disengaged, being biased away from driving member 14 by means of a coil spring 41 engaging bearings 31 and a plate 42 held in position on the end of shaft 27 by a retaining member 43. A driving pinion 44 is secured to the end of shaft 27 and meshes with a spur gear 45 forming part of gearing 25. Spur gear 45 drives a pinion 46 which meshes with a spur gear 47 on a shaft 48 extending through the housing 50' enclosing gearing 25. A suitable coupling member 51 secures flexible shafting 20 in driving relation with shaft 48.

Mounted on the inner surface of end wall 33 of clutch housing 34 is a brake shoe 52 of deformable material. A preferred material is cork. The face of driving disk 26 adjacent brake shoe 52 is formed with a plurality of concentric projections or ridges 53, preferably in the form of V grooves, as illustrated more particularly in Fig. 3. When spring 41 biases driven member 24 into engagement with brake shoe 52, the V grooves or projections 53 become imbedded in the brake shoe, deforming the same, as indicated in Fig. 2, greatly increasing the area of braking contact.

In a manner similar to that described in my Patent No. 2,267,114, issued December 23, 1941, for "Electromagnetic clutch," winding 38 is connected in electric circuit relation with the motor 10. When motor 10 is energized winding 38 is likewise energized, and a magnetic circuit is established drawing driven member 26 into frictional and magnetic coaction with driving member 14 so that the torque of the motor is transmitted through clutch 15 and gearing 25 to shafting 20. When winding 38 is energized, a magnetic circuit is established as indicated by the arrows. Such magnetic circuit extends from hub 13 through disk 23, surface 30 of disk 26, member 35, plate 36, winding support 37, and back into hub 13. As explained above, disk 26 is considerably larger in diameter than disk 23 and extends relatively close to sleeve 35. On the other hand, the periphery of disk 14 is spaced a relatively greater distance from sleeve 35. Hence, there is no tendency for a magnetic circuit to be established directly between disk 26 and sleeve 35. Rather, the magnetic circuit passes from disk 23 into disk 26 and thence into member 35.

As distinguished from prior constructions, the increased area of disk 26 affords a greater braking surface necessitating less pressure against brake shoe 52 to obtain the same braking effort. The braking effort is enhanced by the V-shaped grooves or projections 53 which multiply the area of braking contact a number of times. The increase in the braking surface area permits the use of a much lighter braking spring 41 than would otherwise be necessary. Correspondingly, the number of ampere turns in magnetizing winding 38 may be reduced to improve the efficiency of the electric motor circuit. However, if the number of ampere turns in winding 38 is maintained the same, the magnetic attraction, and thus the torque transmitted by clutch 15, are greatly increased. As the driving disk is undercut as indicated at 28, substantially all the magnetic field is concentrated at the area where disk 23 engages clutching surface 30, and at a greater average radial distance from the center of rotation, thereby effecting maximum torque.

When motor 10 is deenergized, winding 38 is deenergized simultaneously therewith, interrupting the magnetic circuit. Spring 41 instantly snaps the braking surface of disk 26 into engagement with deformable brake shoe 52. This substantially instantly stops motion of driven member 24, gearing 25 and flexible shafting 20. At the same time, the motor armature is permitted to coast to a stop to dissipate its relatively high amount of kinetic energy due to its high rotational speed.

Fig. 2 illustrates a modified form of construction in which the same reference characters primed have been used to indicate like or corresponding parts. As the construction illustrated in Fig. 2 is generally substantially the same as that illustrated in Fig. 1, the description thereof will not be repeated in detail. In the modified embodiment of Fig. 2, the disk portion 23' of clutch driving member 14' is formed with a frusto-conical peripheral clutching surface 56. Surface 56 is adapted to have magnetic and frictional coaction with a complementary frusto-conical peripheral clutching surface 57 on the disk portion 26' of driven member 24'. The peripheral portion 58 of driven member 24' is disposed between the periphery of driving member 14' and sleeve 35'. Thereby, the magnetic flux path is from hub portion 13' through disk portion 23', peripheral portion 58, sleeve 35', ring 36', winding core or support 37' and back into hub 13'.

The construction of Fig. 2 attains the advantages of a conical type of clutch. Due to the frusto-conical clutching surfaces, a greater area of frictional engagement is provided resulting in higher torque transmitting properties. As in the embodiment previously described, the braking surface of disk 26' is provided with concentric V projections or grooves 53' which imbed themselves in deformable brake shoe 52 to greatly increase the braking effort exerted on driven member 24' upon deenergization of winding 38'.

The described construction is also particularly advantageous if used in the clutch-brake unit described and claimed in my copending application Serial No. 552,442, filed September 2, 1944, for "Electromagnetic clutch with centrifugal brake," assigned to the same assignee as the present application. In the construction of said copending application, the transmission of higher torques through the present clutch arrangement permits higher clutching face separating forces to exist due to the energy stored in the rotating balls. Furthermore, as less braking pressure is required due to the increased braking area and the use of the concentric V grooves or projections, the force required to be exerted by the centrifugal balls of said copending application is greatly reduced.

Additionally, the construction of the invention clutch-brake unit is simplified over constructions hitherto used. No special devices are needed to increase the magnetic and frictional coaction between the driving and driven members of the clutch when the clutch winding is energized. Furthermore, a fewer number of air gaps are present in the construction of the invention than in electrimagnetic clutches of equivalent torque transmitting qualities, without any reduction in the magnetic and frictional coaction between the clutch disks.

While specific embodiments of the invention have been shown and described to illustrate the application of the principles thereof, it will be understood that the invention may be otherwise embodied without departing from such principles.

What is claimed is:

1. An electromagnetic clutch comprising, in combination, a driving member of magnetic material having a clutching surface; a driven member of magnetic material having a clutching surface magnetically and frictionally coactable with the first member surface, the periphery of said driven member being a substantial distance outwardly of the periphery of said driving member; a housing member of magnetic material surrounding said first and second members and magnetic flux generating means including a winding supported within said housing member for producing the magnetic flux for the clutch for establishing frictional engagement between said clutching surfaces; said housing member extending closer to the periphery of said driven member than to said driving member to establish a relatively low reluctance magnetic air gap therewith and to insure passage of the magnetic flux from said driving member through said driven member before entering said housing member.

2. An electromagnetic clutch comprising, in combination, a rotatable driving disk of magnetic material having a clutching surface; a rotatable driven disk of magnetic material having a clutching surface magnetically and frictionally coactable with the driving disk clutching surface; a tubular member of magnetic material stationary with respect to and surrounding said disks; and magnetic flux generating means including a winding supported within said housing member for producing the magnetic flux for the clutch for establishing frictional engagement between said clutching surfaces said driven disk having a larger diameter than said driving disk and extending close to the inner surface of said member to establish a relatively low reluctance magnetic air gap therewith and to insure passage of the magnetic flux from said driving disk through said driven disk before entering said member.

3. An electromagnetic clutch comprising, in combination, a driving member of magnetic material having a clutching surface; a driven member of magnetic material having a clutching surface adjacent its periphery magnetically and frictionally coactable with the driving member surface, the periphery of said driven member being a substantial distance outwardly of the periphery of said driving member; a housing member of magnetic material surrounding said driving and driven members and magnetic flux generating means including a winding supported within said housing member for producing the magnetic flux for the clutch for establishing frictional engagement between said clutching surfaces; said housing member extending closer to the periphery of said driven member than to said driving member to establish a relatively low reluctance magnetic air gap therewith and to insure passage of the magnetic flux from said driving member through said driven member before entering said housing member.

4. An electromagnetic clutch comprising, in combination, a rotatable driving disk of magnetic material having a clutching surface; a hub of magnetic material extending from said driving disk for attachment to the shaft of power driving means; a rotatable driven disk of magnetic material having a clutching surface magnetically and frictionally coactable with the first disk clutching surface; a shaft extending from said driven disk for attachment to a driven member; a housing of magnetic material stationary with respect to and surrounding said disks; a winding core of magnetic material secured within said housing and closely spaced from said hub to constitute a magnetic path of low reluctance between the housing and hub; and a winding arranged on said core for establishing the magnetic flux for the clutch for establishing frictional engagement between said clutching surfaces said driven disk having a larger diameter than said driving disk and the periphery of said driven disk lying nearer to the inner surface of said housing than the periphery of said driving disk to establish a relatively low reluctance magnetic air gap therewith and to insure passage of the magnetic flux from said driving disk through said driven disk before entering said member.

5. An electromagnetic clutch comprising, in combination; a rotatable driving disk of magnetic material having a clutching surface; a hub of magnetic material extending from said driving member for attachment to the shaft of power driving means; a rotatable driven disk of magnetic material having a clutching surface magnetically and frictionally coactable with the first disk clutching surface and a braking surface formed with a plurality of concentric grooves; a stationary brake shoe of deformable material arranged adjacent said braking surface; a shaft extending from said driven disk for attachment to a driven member; a tubular member of magnetic material stationary with respect to and surrounding said disks; said driven disk having a larger diameter than said driving disk and extending closer to the inner surface of said member than said driving disk to establish a relatively low reluctance magnetic air gap therewith and to insure passage of the magnetic flux from said driving disk through said driven disk before entering said member; a winding core of magnetic material secured within said member and closely spaced from said hub to constitute a magnetic path of low reluctance between the member and hub; a winding arranged on said core for establishing the magnetic flux for the clutch for establishing frictional engagement between said clutching surfaces; and means normally mechanically biasing said braking surface into engagement with said brake shoe to accelerate stopping of such driven member upon deenergization of said winding; said grooves defining projections deforming the material of said brake shoe to increase the braking effect on said driven disk by increasing the area of brake engagement.

6. An electromagnetic clutch comprising, in combination, a rotatable driving disk of magnetic material having a clutching surface; a rotatable driven disk of magnetic material; a tubular member of magnetic material stationary with respect to and surrounding said disks and magnetic flux generating means including a winding supported within said member for producing the magnetic flux for the clutch for establishing frictional engagement between said clutching surfaces; said driven disk having a peripheral clutching surface disposed between the periphery of said driving disk and said tubular member and magnetically and frictionally coactable with the first disk clutching surface, and extending close to the inner surface of said member to establish a relatively low reluctance magnetic air gap therewith and to insure passage of the magnetic flux from said driving disk through said driven disk before entering said member.

7. An electromagnetic clutch comprising, in combination, a rotatable driving disk of magnetic material having a clutching surface; a hub of magnetic material extending from said driving member for attachment to the shaft of power driving means; a rotatable driven disk of magnetic material; a shaft extending from said driven disk for attachment to a driven member; a tubular member of magnetic material stationary with respect to and surrounding said disks; a winding core of magnetic material secured within said member and closely spaced from said hub to constitute a magnetic path of low reluctance between the member and hub; and a winding arranged on said core for establishing the magnetic flux for the clutch for establishing frictional engagement between said clutching surfaces; said driven disk having a peripheral clutching surface disposed between the periphery of said driving disk and said tubular member and magnetically and frictionally coactable with the driving disk clutching surface and extending close to the inner surface of said member to establish a relatively low reluctance magnetic air gap therewith and to insure passage of the magnetic flux from said driving disk through said driven disk before entering said member.

8. An electromagnetic clutch comprising, in combination, a rotatable driving disk of magnetic material having a frusto-conical peripheral clutching surface; a hub of magnetic material extending from said driving member for attachment to the shaft of power driving means; a rotatable driven disk of magnetic material; a shaft extending from said driven disk for attachment to a driven member; a tubular member of magnetic material stationary with respect to and surrounding said disks; said driven disk having a frusto-conical clutching surface disposed between the periphery of said driving disk and said tubular member and magnetically and frictionally coactable with the driving disk clutching surface, and extending close to the inner surface of said member to establish a relatively low reluctance magnetic air gap therewith and to insure passage of the magnetic flux from said driving disk through said driven disk before entering said member; said driven disk having a braking surface formed with a plurality of concentric grooves; a stationary brake shoe of deformable material arranged adjacent said braking surface; a winding core of magnetic material secured within said member and closely spaced from said hub to constitute a magnetic path of low reluctance between the member and hub; a winding arranged on said core for establishing the magnetic flux for the clutch for establishing frictional engagement between said clutching surfaces; and means normally mechanically biasing said braking surface into engagement with said brake shoe to accelerate stopping of such driven member upon deenergization of said winding; said grooves constituting projections deforming the material of said brake shoe to increase the braking effect on said driven disk by increasing the area of brake engagement.

9. A braking device for a rotatable shaft comprising a member secured to said shaft and having a braking surface formed with a plurality of concentric projections; a stationary brake surface of deformable material arranged adjacent said braking surface; and means for urging said braking surface into engagement with said brake surface to arrest rotation of the shaft, said projections deforming the material of said brake surface to increase the effective area of brake engagement.

10. A braking device comprising a rotatable disk having a braking surface formed with a plurality of concentric grooves; a stationary brake surface of deformable material arranged adjacent said braking surface; and means for urging said braking surface into engagement with said brake surface to arrest rotation of said disk, said grooves constituting projections deforming the material of said brake surface to increase the effective area of brake engagement.

11. A braking device comprising a rotatable disk having a braking surface formed with a plurality of concentric projections; a stationary brake surface of deformable material arranged adjacent said braking surface; means for normally biasing said braking surface into engagement with said brake surface to restrain rotation of said disk shaft, said projections thereupon deforming the material of said brake to increase the effective area of brake engagement and other means selectively operable to move said disk away from said brake surface to provide for rotation of said disk.

12. An electromagnetic clutch comprising in combination a driving disk and a driven disk, both of magnetic material and each having a clutching surface, one of said disks having a substantially cylindrical cavity in one face thereof defining, with the periphery of said one disk, an annular portion outstanding with respect to the floor of the cavity, the radial face of said portion constituting the clutching surface, and the same being in face-to-face relation with said other clutching surface, the outer diameter of the said one of said disks being greater than the other, means responsive to energization of the clutch for providing magnetic flux through said two disks, said means including a housing adjacent the periphery of said disks, the principal part of said flux threading said housing and thence said annular portion to confine the clutching effect of the flux to an annular zone adjacent the periphery of the disks.

WILLIAM P. LEAR.

REFERENCES CITED

The following references are of record in the file of this patent:

UNITED STATES PATENTS

| Number | Name | Date |
| --- | --- | --- |
| 505,025 | Broun | Sept. 12, 1893 |
| 936,284 | Abernethy | Oct. 12, 1909 |
| 951,992 | Johnson | Mar. 15, 1910 |
| 1,057,105 | Wolpert | Mar. 25, 1913 |
| 1,523,413 | Gent | Jan. 20, 1925 |
| 1,601,791 | Bing | Oct. 5, 1926 |
| 1,759,377 | Tappan | May 20, 1930 |
| 2,105,323 | Hunt | Jan. 11, 1938 |
| 2,163,884 | La Brie | June 27, 1939 |
| 2,209,776 | Kiekhaefer | July 30, 1940 |
| 2,242,216 | Kraft | May 20, 1941 |
| 2,267,114 | Lear et al. | Dec. 23, 1941 |
| 2,315,298 | Thompson | Mar. 30, 1943 |
| 2,396,153 | Butler | Mar. 5, 1946 |

FOREIGN PATENTS

| Number | Country | Date |
| --- | --- | --- |
| 631,828 | Germany | June 27, 1936 |